W. E. COFFIN.
HAND BRAKE MECHANISM.
APPLICATION FILED DEC. 27, 1915.

1,199,764.

Patented Oct. 3, 1916.
3 SHEETS—SHEET 1.

Inventor
Walter E. Coffin
By his Attorney

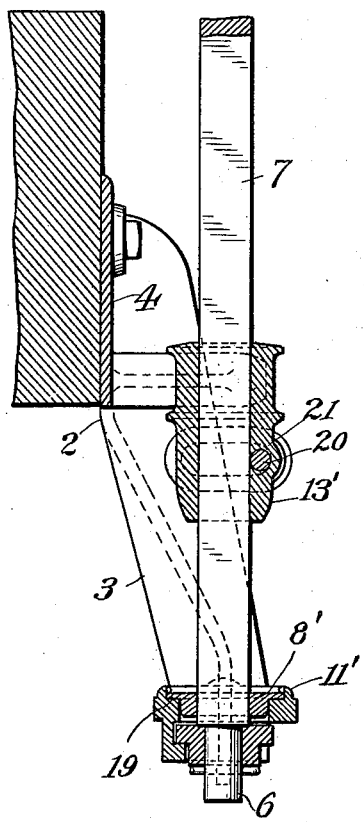
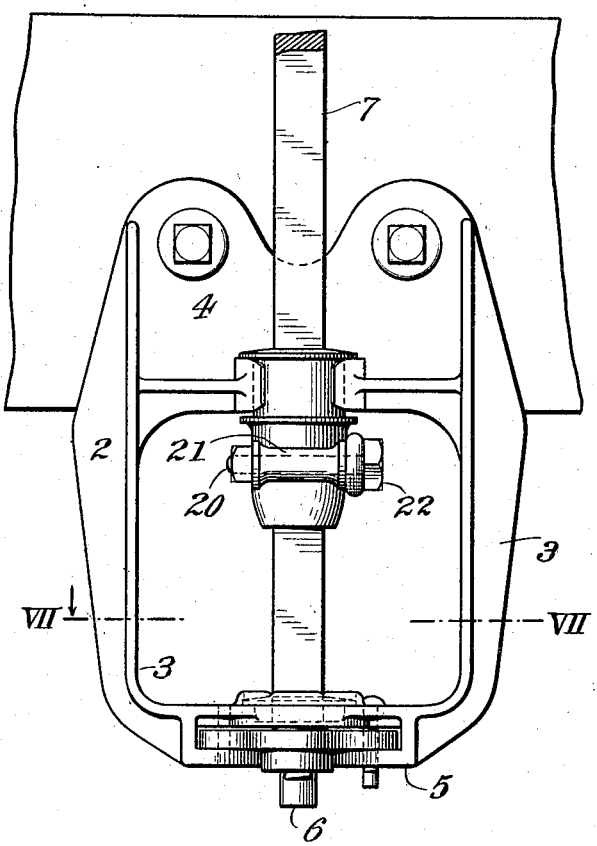
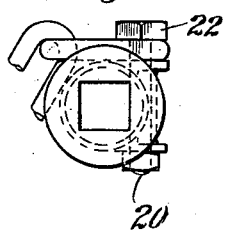
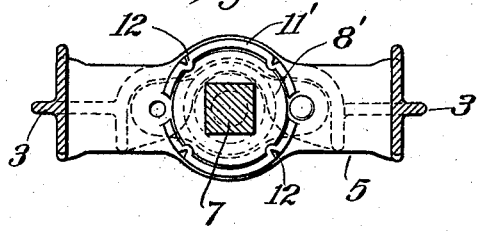

W. E. COFFIN.
HAND BRAKE MECHANISM.
APPLICATION FILED DEC. 27, 1915.

1,199,764.

Patented Oct. 3, 1916.
3 SHEETS—SHEET 3.

Inventor
Walter E. Coffin
By his Attorney

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

HAND BRAKE MECHANISM.

1,199,764.  Specification of Letters Patent.  Patented Oct. 3, 1916.

Application filed December 27, 1915. Serial No. 68,666.

*To all whom it may concern:*

Be it known that I, WALTER E. COFFIN, a citizen of the United States, residing at Cleveland, Cuyahoga county, Ohio, have invented new and useful Improvements in Hand Brake Mechanisms, of which the following is a specification, reference being had to the accompanying drawings, in which—

Figure 1:
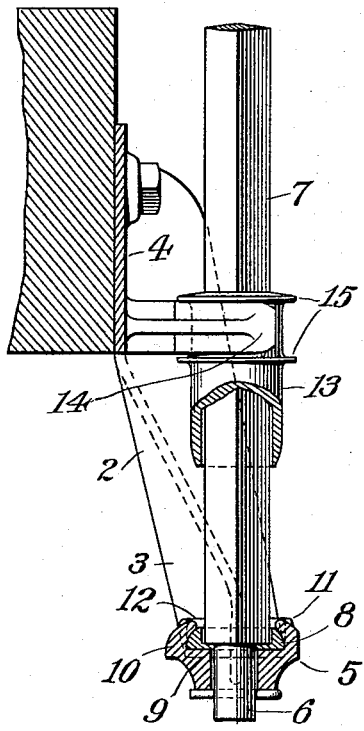
Figure 2:
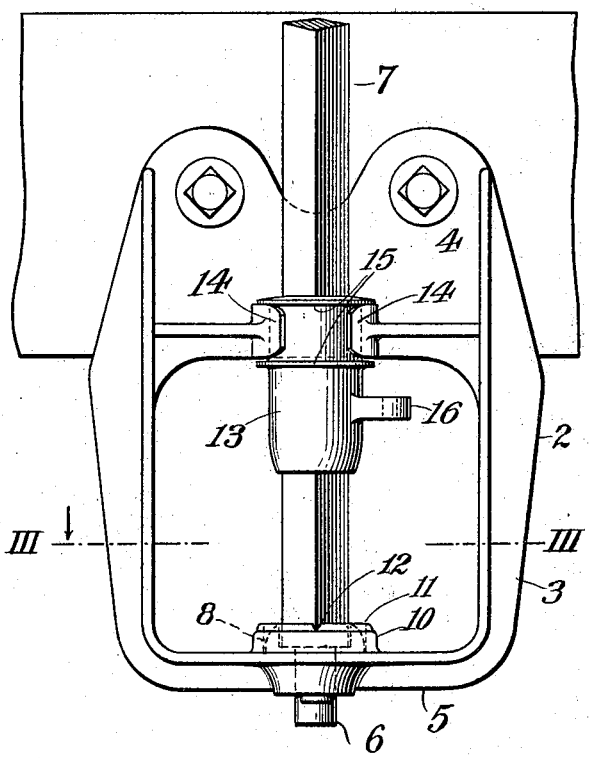
Figure 4:
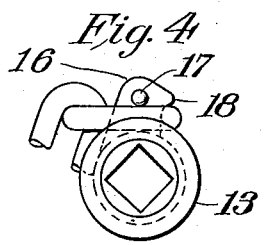
Figure 3:
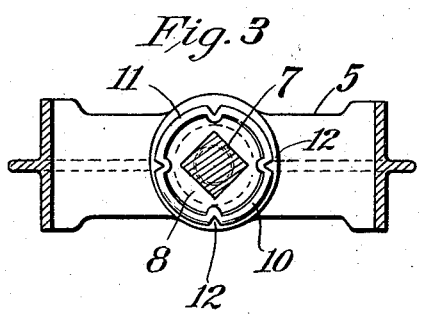
Figure 9:
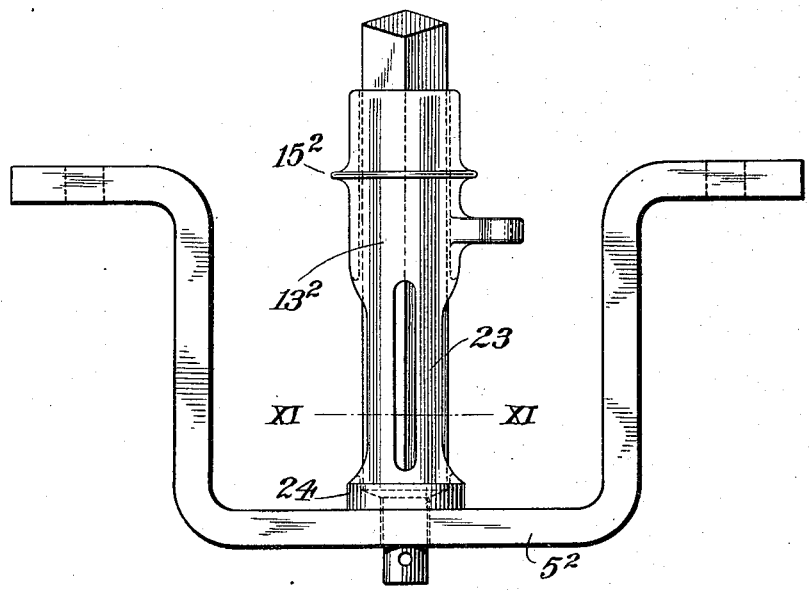
Figure 10:
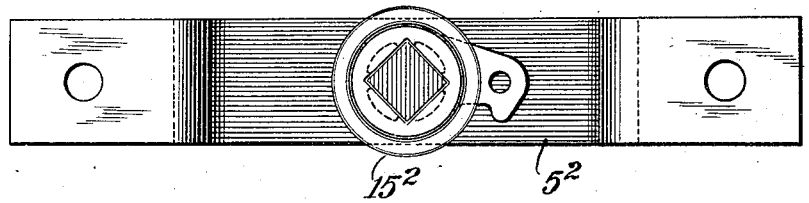
Figure 11:
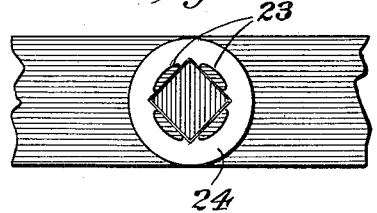

Figure 1 is a side elevation, partly in section, showing a brake mechanism embodying my improvements applied to an end sill of a car; Fig. 2 is a front elevation thereof; Fig. 3 is a section on lines III—III of Fig. 2; Fig. 4 is a plan of the sleeve showing the brake chain attached thereto; Fig. 5 is a side elevation, partly in section, showing mechanism embodying a modification of my invention; Fig. 6 is a front elevation thereof; Fig. 7 is a section on lines VII—VII of Fig. 6; Fig. 8 is a plan of the sleeve with the brake chain attached thereto; Fig. 9 is an elevation showing a further modification; Fig. 10 is a plan thereof; and Fig. 11 is a section on lines XI—XI of Fig. 9.

My invention relates to hand-operated brake mechanisms, and consists in a novel arrangement of the chain-winding mechanism and of a support for the brake shaft.

My invention also consists in the coöperation and construction of the parts which I shall hereinafter describe and claim.

Referring to the drawings, 2 is the brake shaft step, preferably made integral and having a U-shaped frame 3 adapted to be attached to the end sill of a car by the back plate 4. The frame, at the center of its base portion 5, has an aperture for reception of the reduced lower end 6 of the brake shaft 7. The brake shaft 7, which is preferably rectangular in cross section, is supported by a collar 8, seated on the portion 5 of the step, which takes about the lower end of the rectangular portion of the brake shaft and has an aperture 9 for the reduced lower end 6 of the brake shaft. The collar 8 is held in position by an annular abutment 10, on the portion 5 of the step, the lip or flange 11 of which may be bent over to hold the collar 8 from disengagement from the step, as is indicated at 12. It will thus be seen that when the brake shaft rotates, the collar 8 will rotate with it and will form a bearing on the step for the lower end of the shaft.

Mounted on the brake shaft is a sleeve or chain-winding member 13, which is held from movement relative to the brake shaft step by the bendable lugs 14, which take about the sleeve between its flanges 15. The sleeve 13 has a lug 16 preferably cast integral therewith, intended for attachment of the chain thereto, one of the chain links being slipped over the lug 16 and being held closely against the side of the sleeve by a cotter pin 17, as is shown in Fig. 4. The lug 16 also has a projection 18, which also serves to keep the chain close to the body of the sleeve and relieves the cotter pin of strain. When the mechanism is used it will be seen that, as the brake shaft is rotated, the chain will wind directly about the brake shaft 7 between the sleeve 13 and the collar 8, and a greater leverage will be obtained than if the sleeve without reduction in diameter extended clear to the base portion 5 of the step, because the portion of the shaft 7 which the chain engages is of smaller cross section than the cross-section of the sleeve.

In Figs. 5, 6, 7 and 8 I have shown a modification of my device, in which my invention is applied to a drop shaft mechanism of the character shown in my Patent, No. 1,098,428, granted June 2, 1914, in which the aperture through the collar 8' is rectangular in cross section to admit moving of the brake shaft therethrough when the shaft is dropped to lowermost position. The collar 8' provides a lateral bearing between the lower end of the brake shaft and bottom of the step and is held in position by means of the flange or lip 11', which is turned inwardly over the annular extension 19 on the collar 8'. The brake chain is secured to the sleeve 13' by bolt 20 seated in a horizontal aperture 21 in the sleeve, and in which the bolt-head 22 holds the end link of the chain close against the sleeve.

In Figs. 9, 10 and 11 I have shown a further modification of my device for use with an ordinary brake shaft step and in which the sleeve $13^2$ is carried down to the horizontal portion $5^2$ of the step so as to provide a support for the sleeve. The lower portion of the sleeve, about which the chain winds, is made in skeleton form so as to reduce its diameter, and consists in four arms 23 which lie closely against the flat sides of the brake shaft and between its angles. These arms 23 are terminated in a collar 24 which forms the bearing of the sleeve on the step. The sleeve also has a flange 15² near its upper end which may be used as a stop to prevent vertical movement of the sleeve away from the step.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In a hand brake mechanism, a brake shaft, a brake shaft step, the brake shaft step being apertured for reception of the lower end of the brake shaft and having a circular abutment on its base, a collar on the brake shaft adapted to rotate therewith, said collar being seated in said abutment, and means for holding the collar from displacement relative to the step.

2. In a hand brake mechanism, a brake shaft, a brake shaft step, the brake shaft step being apertured for reception of the lower end of the brake shaft and having a circular abutment on its base, and a collar on the brake shaft adapted to rotate therewith, said collar being seated in said abutment, said abutment having a bendable flange adapted to be upset to prevent displacement of the collar in a vertical direction.

3. In a hand brake mechanism, a brake shaft, a brake shaft step, and a sleeve mounted on the brake shaft and having means thereon for securing a brake chain thereto, said sleeve having a pair of outwardly-extending flanges engaging between them a portion of the step to prevent vertical movement of the sleeve relative to said step.

4. In a hand brake mechanism, a brake shaft rectangular in cross section, a brake shaft step, a sleeve mounted on the brake shaft, a collar mounted on the brake shaft below said sleeve and forming a bearing for the shaft in the step, said collar being rotated with said shaft, and means for holding the collar from vertical movement relative to said step.

5. In a hand brake mechanism, a brake shaft, a brake shaft step, and a sleeve mounted on the brake shaft and having a lug for reception of the end link of a brake chain, said lug also having a horizontally extending lip arranged to hold the brake chain close against the sleeve.

6. In a hand brake mechanism, a brake shaft, a brake shaft step, a sleeve mounted on the brake shaft and having means thereon for securing a brake chain thereto, said brake chain being adapted to be wound about the portion of the brake shaft below the chain securing portion of said sleeve, and means on the sleeve coöperating with means on the step for preventing the sleeve from being moved vertically relative to the step.

WALTER E. COFFIN.

Copies of this patent may be obtained for five cents each, by addressing the "Commissioner of Patents. Washington, D. C."